United States Patent
Narayanaswamy et al.

(10) Patent No.: US 6,931,501 B1
(45) Date of Patent: Aug. 16, 2005

(54) METHOD AND APPARATUS FOR MERGING CONTIGUOUS LIKE COMMANDS

(75) Inventors: Manjunath Narayanaswamy, Sunnyvale, CA (US); Madhuresh Nagshain, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 136 days.

(21) Appl. No.: 10/045,128

(22) Filed: Oct. 26, 2001

(51) Int. Cl.[7] .............................................. G06F 13/14
(52) U.S. Cl. .................. 711/158; 711/112; 710/32; 710/39
(58) Field of Search ............... 711/112, 150, 154, 711/159, 165, 168; 710/20–21, 39, 32, 52, 710/5, 6, 28; 709/250; 713/1

(56) References Cited

U.S. PATENT DOCUMENTS

| | | | |
|---|---|---|---|
| 5,765,193 A | * | 6/1998 | Rosich et al. ............... 711/136 |
| 5,802,366 A | * | 9/1998 | Row et al. ................... 709/250 |
| 5,802,546 A | * | 9/1998 | Chisholm et al. ........... 711/100 |
| 5,974,544 A | * | 10/1999 | Jeffries et al. ................. 713/1 |
| 6,138,176 A | * | 10/2000 | McDonald et al. ............ 710/6 |
| 6,145,017 A | * | 11/2000 | Ghaffari ........................ 710/5 |

* cited by examiner

*Primary Examiner*—Pierre M. Vital
(74) *Attorney, Agent, or Firm*—Martine Penilla & Gencarella, LLP

(57) ABSTRACT

Methods and a system for combining commands for data transfers between a drive and memory. One exemplary method includes receiving multiple read or write commands in a queue. Then, a first command of the multiple read or write commands is processed. Next, the multiple read or write commands are combined. The combination includes identifying like commands each being associated with a file stored on a drive and ascertaining which of the files associated with the like commands are contiguous. Then, a combined command is created, where the combined command consolidates the identified like commands being associated with contiguous files. Next, the combined command is issued to the drive.

14 Claims, 4 Drawing Sheets

METHOD AND APPARATUS FOR MERGING CONTIGUOUS LIKE COMMANDS

BACKGROUND OF THE INVENTION

1. Field of the Invention

This invention relates generally to methods and apparatus for improving computer performance and more specifically to improve disk input/output performance by combining multiple consecutive read or write requests to a disk drive.

2. Description of the Related Art

The operating system (OS) of a computer is constantly sending read and write commands to a disk driver which in turn sends the commands to the disk. FIG. 1 illustrates block diagram 100 depicting how read and write commands are handled in the prior art. The operating system 102 sends read and write commands to the disk driver 104. The disk driver 104 then sends the commands to storage media 108 and 110 via the bus 106. Each of the read and write commands of FIG. 1 are individually sent to the driver 104 one after the other, upon completion of the preceding command.

For each command being sent to the driver, an interrupt is generated to notify the central processing unit (CPU) it is done processing the command and is ready for the next command. For example, ten read or write commands from the operating system will correspond to ten interrupts being sent to the CPU. For each interrupt the processor must stop its current task and process the commands. Typically, context switching or task switching, where the CPU switches from one context or task to another, is employed to accommodate the interrupts of the CPU so as to make the processing transparent to a user. However, there is a very high cost in terms of performance because of the interrupts and the attention they demand from the CPU. Even for the instances of multiple reads or writes that are contiguous on the disk, separate interrupts are generated for each read or write command, thereby demanding more of the CPU's attention. In addition, under context switching the CPU has to save what it was doing prior to the interrupt so that after processing the interrupt the CPU can return to what it was processing. In other words, the CPU has to flush its pipeline of instructions typically to a special area of random access memory (RAM) called a stack, process the interrupt and then access the RAM to re-fill its pipeline to continue processing as it was prior to the interrupt. The constant interrupts can hog the CPU.

Moreover, the separate commands cause increased mechanical wear on the disk drive system. For example, where multiple commands are received for files or file fragments in the same area of the disk, the disk is required to start and stop multiple times. It should be appreciated that each time the disk starts and stops missed spins result which in turn cause an increase in mechanical stress. More specifically, where 10 commands are issued for the same area of the disk, the disk will start and stop 9 times with each start and stop resulting in a missed spin. Accordingly, the latency and seek times are high due to the superfluous disk rotation.

Yet another drawback of the unnecessary mechanical activity of the disk drive is the wear and tear on the disks and the electromagnetic head. The extra mechanical movements, for example, start stop pulses, work toward decreasing the longevity of the mechanical parts, thereby decreasing the mean time between failure.

Write back cache techniques are currently utilized to enhance performance, however, the techniques employ a buffer where the data is temporarily resident. Thus, the data stays in memory longer and as such is at risk of being lost should the computer crash or shutdown prior to the data being written to disk.

As a result, there is a need to solve the problems of the prior art to improve disk input/output performance by combining multiple consecutive operating system read and write requests to a disk drive into one request with one interrupt without subjecting the data to an increased risk of loss.

SUMMARY OF THE INVENTION

Broadly speaking, the present invention fills these needs by providing methods and an apparatus which combines like commands contiguous on a drive side which in turn issues one interrupt for the combined commands. It should be appreciated that the present invention can be implemented in numerous ways, including as a process, an apparatus, a system, or a device. Several inventive embodiments of the present invention are described below.

In one embodiment, a method for merging contiguous like commands for transfers between a storage medium and memory is provided. The method initiates with accumulating a plurality of commands in a queue while a first command is being processed by a disk drive. Next, the plurality of commands in the queue are examined while the first command is being processed. The examination includes checking if any of the plurality of commands are like commands where each of the like commands corresponds to a file stored on the storage medium. Also included in the examination is determining if any of files on the storage medium are stored contiguously with respect to one another. Then, the like commands corresponding to contiguous files are combined. Then, the combined command is issued to the storage medium upon the completion of the processing of the first command.

In another embodiment, a method for combining commands for data transfers between a drive and memory. The method initiates with multiple read or write commands being received in a queue. Next, a first command of the multiple read or write commands is processed. Then, the remaining multiple read or write commands are combined. The combining includes identifying like commands of the multiple read or write commands while processing the first command, where each of the like commands are associated with a file stored on a drive. Also included in the combining is ascertaining which of the files associated with the like commands are contiguous files. Next, a combined command is created, the combined command is configured to consolidate the identified like commands being associated with contiguous files. Then, the combined commands are issued to the drive.

In yet another embodiment, an apparatus for merging contiguous like commands is provided. The apparatus includes an operating system which generates read and write commands. A storage media is included. The storage media is configured to process read and write commands, where the read and write commands are associated with files stored on the storage media. The apparatus includes a driver queue configured to receive read and write commands from the operating system. The read and write commands are examined in the driver queue to identify like commands associated with contiguous files on the storage media, where the identified commands are combined into one command which is issued to the storage media.

In still another embodiment, a computer readable media having program instructions for combining commands for data transfer between a drive and memory, is provided. The computer readable media includes program instructions for receiving multiple read or write commands in a queue and program instructions for processing a first command of the multiple read or write commands. Program instructions for combining multiple read or write commands are included. Included in the program instructions for combining multiple read or write commands are program instructions for identifying like commands of the multiple read or write commands while processing the first command, where each of the like commands are associated with a file stored on the drive, and program instructions for ascertaining which of the files associated with the like commands are contiguous files. Program instructions for creating a combined command, where the combined command is configured to consolidate the identified like commands associated with contiguous files. Program instructions for issuing the combined command to the drive are also included.

The advantages of the present invention are numerous. Most notably, the combined commands once processed will issue only one interrupt, thereby improving performance. Since only the transfer time of the various time components of a command is additive when multiple components are combined, performance is further enhanced. Additionally, the wear on the drive is minimized through the combination of the commands.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
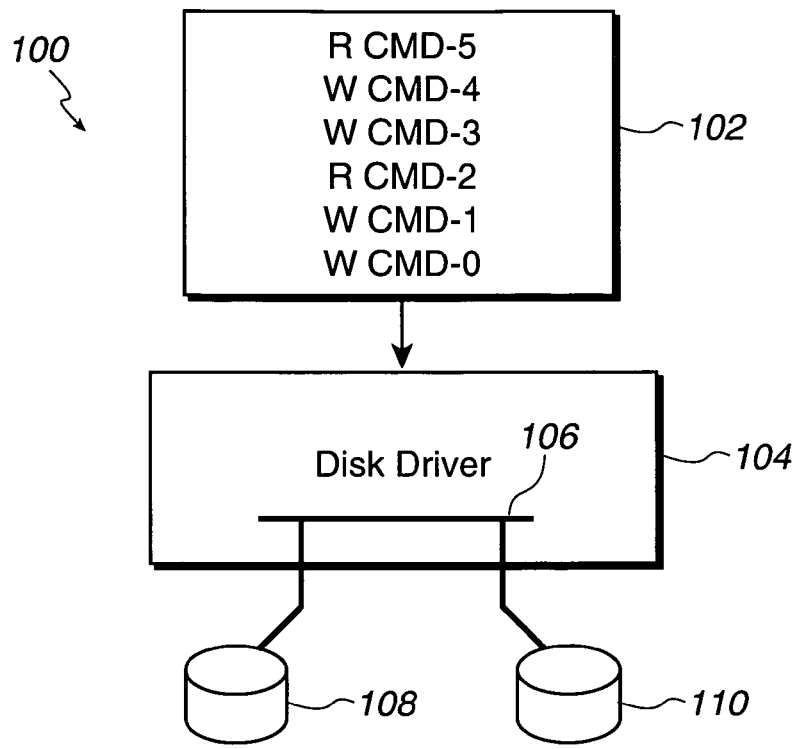
FIG. 1 illustrates a block diagram depicting how read and write commands are handled in the prior art.

An invention is described for an apparatus and method for combining multiple read and write requests from the operating system, thereby minimizing the number of interrupts sent to the central processing unit (CPU). It will be obvious, however, to one skilled in the art, that the present invention may be practiced without some or all of these specific details. In other instances, well known process operations have not been described in detail in order not to unnecessarily obscure the present invention.

The embodiments of the present invention provide an apparatus and method for merging read and/or write commands for improving system performance of a computer. The operating system (OS) of a computer sends read and/or write commands to a driver queue. Since the CPU is so much faster than the disk, there is a built in delay that occurs as the disk is processing an issued command from the driver. As the disk is processing the issued command, additional commands are accumulating in the driver queue. During the built in delay, the additional commands are examined to see if they are like commands, i.e., read vs. write commands in one embodiment. The commands are also examined to determine if they are contiguous on the disk drive side. In one embodiment of the invention, the commands are examined in the internal queue of the disk driver.

If the examined commands are like commands and they are contiguous, then the commands are combined so that they are issued as one read or write command in one embodiment. It should be appreciated that this examination takes place while the disk is processing an issued command. In other words, the examination process does not add any delays or latency to the system performance. Therefore, once the disk is ready to receive the next command, any combined commands are sent to the disk without adding delays for examination of more of the queued commands in one embodiment of the invention.

In another embodiment of the invention, associated with each command is a scatter-gather list (SGL) and a command data block (CDB). In another embodiment, the scatter-gather list provides data pointers, i.e., where the data resides in the random access memory (RAM), while the command data block includes the location of a file on the storage medium such as a disk drive. Additionally, the scatter-gather list contains the memory address of a buffer and a byte count of the data to transfer in one embodiment. It should be appreciated that one command can have multiple memory addresses. Where the commands are contiguous, a new command is generated which includes another CDB and another SGL, both of which contain the combined information of the individual CDB's and SGL's in one embodiment of the invention. By consolidating like contiguous commands into one command, the number of interrupts sent to the CPU is minimized, thereby improving system performance.

Described below are various embodiments of the invention which reference corresponding Figures. It should be appreciated that the embodiments are provided for illustration purposes only and are not meant to limit the invention.

Figure 2:
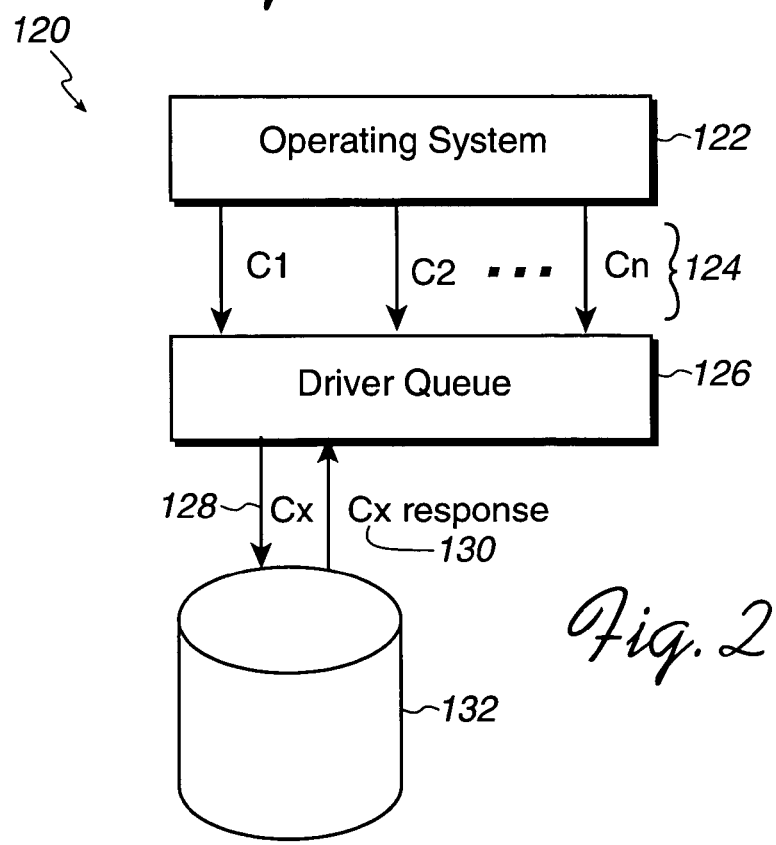
FIG. 2 illustrates block a diagram providing an overview of a command merge system in accordance with one embodiment of the invention.

FIG. 2 illustrates block diagram 120 providing an overview of a command merge system in accordance with one embodiment of the invention. Block diagram 120 displays the operating system 122 generating a number of read and/or write commands $C_1$-$C_n$ 124, which are sent to a driver queue 126. As mentioned above, the commands 124 accumulate in the disk driver queue 126 since the CPU is so much faster than the disk drive 132 which is the ultimate destination of the commands 124. In the driver queue 126, the commands are examined while the drive 132 is processing an issued command. For example, the drive may be processing $C_0$ while commands $C_1$-$C_n$ 124 are accumulating in the disk driver queue 126. The examined commands in the driver queue are then combined where possible. For example, if the commands 124 contain contiguous writes on the drive side, the contiguous write commands are combined into a new command $C_x$ 128 which is then issued to the disk drive 132. It should be appreciated that the same is true for contiguous read commands. Thus, with one command being issued for multiple contiguous read and/or write commands there is only one interrupt generated from the drive. As illustrated in FIG. 2, the command response $C_{x\ response}$ 130 is generated by the drive 132 to notify the disk driver that $C_x$ 128 has been processed.

As mentioned above, the disk driver queue, also referred to as the internal queue, examines the accumulated commands during the time that the drive is processing an issued command so as not to add to the delay or latency. In one embodiment, the $C_{x\ response}$ 130 from the drive 132 signals the disk driver that the previous command has been completed and it is ready to take new commands. In another embodiment, the internal queue has a capacity to hold 256 commands.

Figure 3:
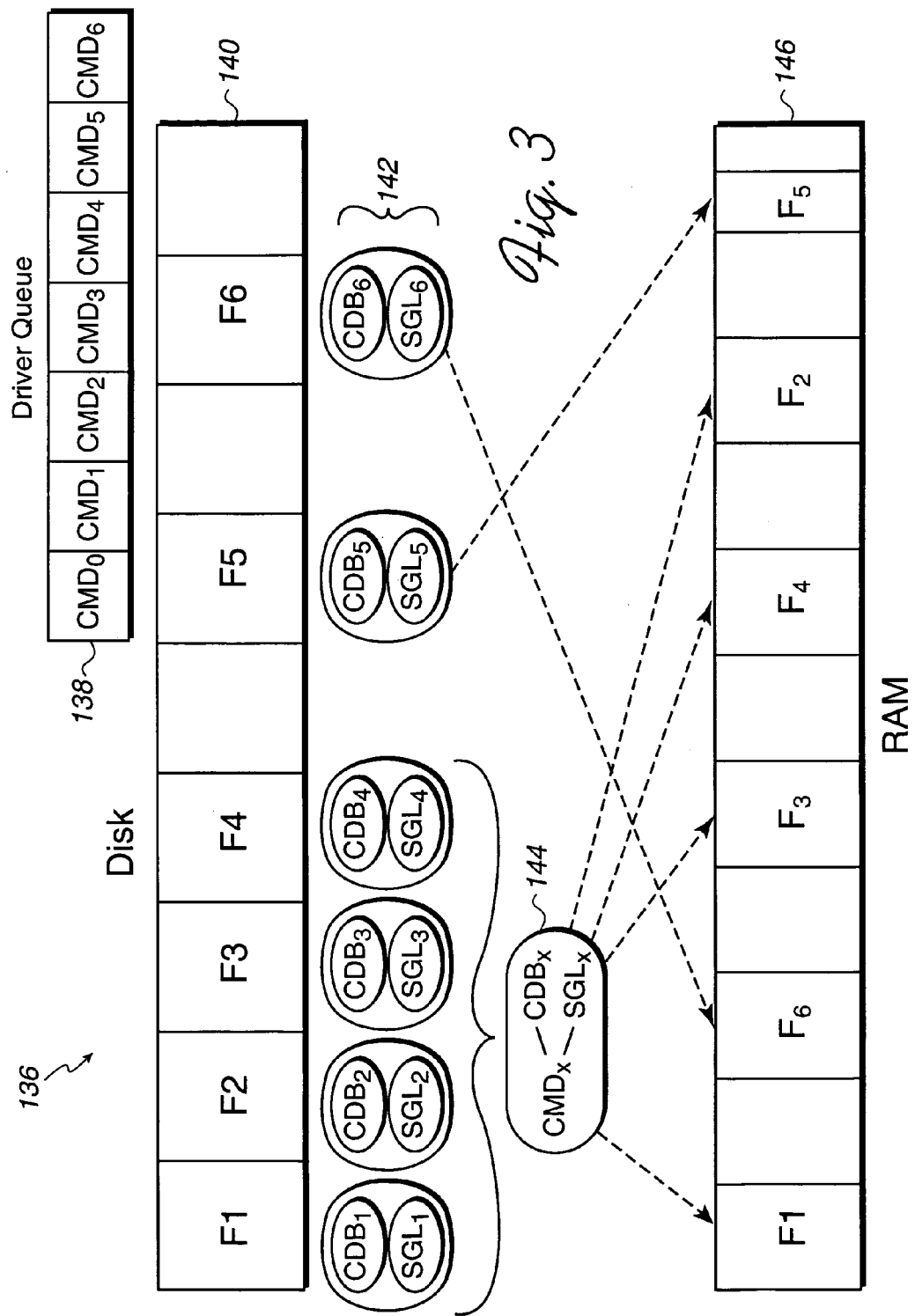
FIG. 3 illustrates a block diagram displaying a more detailed diagram of a command merge system for consolidating read commands in accordance with one embodiment of the invention.

FIG. 3 illustrates block diagram 136 displaying a more detailed diagram of a command merge system for consolidating read commands in accordance with one embodiment of the invention. An internal queue 138 of a disk driver receives commands from the operating system. The driver queue 138 issues the commands to a disk drive in one embodiment. It should be appreciated that since the disk drive is much slower than the CPU, the commands will accumulate in the driver queue 138 under normal operation. For example, initially command 0 ($CMD_0$) is received by the driver queue 138. It should be appreciated that since $CMD_0$ is the first command received by the driver queue, $CMD_0$ is issued to the disk drive without delay as the disk drive is not processing any other commands. While $CMD_0$ is being processed, more commands are being accumulated in the internal queue 138. For illustration purposes $CMD_1$ through $CMD_6$ are shown accumulating in the internal queue 138. In one embodiment, during the processing of $CMD_0$, $CMD_1$ through $CMD_6$ are examined to determine if the commands are like, i.e., if they are reads or writes, and if any like commands are contiguous on the drive side. For illustration purposes $CMD_1$ through $CMD_6$ are all like commands, i.e., read commands. It should be appreciated that $CMD_1$ through $CMD_6$ can be any combination of read and/or write commands.

Also shown in FIG. 3 is the location of files F1 through F6 on storage medium 140. In one embodiment storage medium 140 is a storage disk. Files F1 through F6 are the files corresponding to the read commands $CMD_1$ through $CMD_6$, respectively. In one embodiment, each command is associated with a command data block (CDB) and a scatter gather list (SGL) 142. For example, $CM_1$, of driver queue 138 includes $CDB_1$ and $SGL_1$ 142. In another embodiment, the SGL includes the memory pointers i.e., the location of the data in the random access memory (RAM) and a byte count information for a command, while the CDB includes the location of the file on the disk or storage medium 140, a count of sectors and command information (read or write). Continuing with FIG. 3, files F1-F4 are shown as being contiguous on disk 140. Therefore, when $CMD_1$ through $CMD_6$ of driver queue 138 are examined, the file locations for files F1 through F4 are found to be contiguous. In one embodiment of the invention, the command data blocks ($CDB_1$–$CDB_6$) of the corresponding commands ($CMD_1$–$CMD_6$) are examined to determine the location of the corresponding files on the disk. In this embodiment, the command data blocks contain the location where to read the corresponding files from the disk 140 and how many blocks to read from the disk. It should be appreciated that the command data blocks are be included in an input/output packet in one embodiment.

Block diagram 136 illustrates that once the like contiguous commands are identified, a new command, $CMD_x$ 144, is generated in accordance with one embodiment of the invention. $CMD_x$ 144 includes command data block-x ($CDB_x$) and scatter gather list-x ($SGL_x$). Therefore, like contiguous files F1 through F4 are read as one operation rather than four separate reads. It should be appreciated that one interrupt is generated rather than four interrupts as would be done under the prior art. Once files F1 through F4 are read from disk 140, the files are transferred to their respective location in RAM 146. In one embodiment, the scatter gather list includes the data pointers providing the location of the files in RAM 146. It should be appreciated that since files F5 and F6 are like commands but not contiguous, the read commands for those files are executed without the need to create a new command.

In addition, the creation of the new command 144 for the like contiguous files does not add any delays to the system. As mentioned above, while $CMD_0$ is being processed, the internal queue of the disk driver is accumulating read and write commands from the OS. Because of the relatively slow processing of $CMD_0$ by the disk drive, there exists a delay in which the accumulated commands can be examined and the new command 144 generated without adding any latencies or delays. In one embodiment, when a response from the disk drive is received by the driver queue, notifying the driver queue that the disk drive is completed with the processing, the new read command 144 is issued to the drive. It should be appreciated that by combining the commands for the like contiguous files, the wear on the read/write head and the disk drive itself is considerably reduced. For example, instead of reading F1 and then receiving a command to read F2 after the read/write head has passed the location of F2 on the disk, the read/write head is now enabled to read the contiguous files, F1-F4, in one continuous motion.

Figure 4:
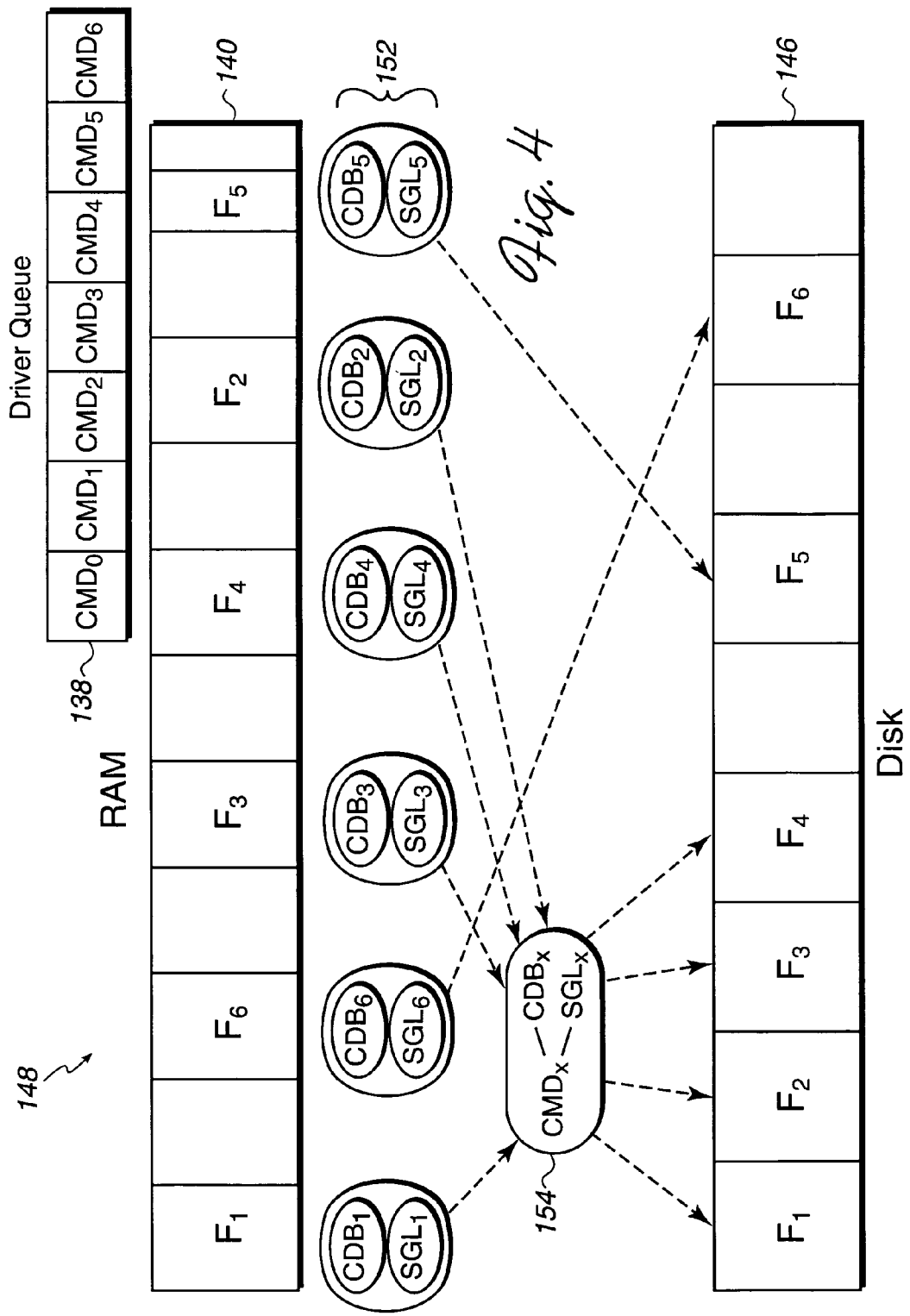
FIG. 4 illustrates a block diagram displaying a more detailed diagram of a command merge system for write commands in accordance with one embodiment of the invention.

FIG. 4 illustrates block diagram 148 displaying a more detailed diagram of a command merge system for write commands in accordance with one embodiment of the invention. Here, internal queue 138 of the disk diver contains write commands $CMD_0$–$CMD_6$. As discussed above with respect to FIG. 3, as $CMD_0$ is being processed $CMD_1$–$CMD_6$ are being accumulated in the driver queue 138. In one embodiment, the accumulated commands are examined to check if the commands are like commands, i.e. read or write commands. The like commands, for example the write commands of FIG. 4, are examined to see if the files being read are contiguous on the drive side. While the commands displayed in driver queue 138 of FIG. 4 are all like commands, i.e. write commands, it should be appreciated that any combination of read and/or write commands can be accumulated in driver queue 138. In one embodiment, driver queue 138 can accumulate 256 commands.

Similar to the read commands of FIG. 3, after any like contiguous write commands of FIG. 4 are identified a new command ($CMD_x$) 154 is generated. In one embodiment, $CMD_x$ 154 includes command data block-x ($CDB_x$) and scatter gather list-x ($SGL_x$). It should be appreciated that C), is a combination of $CMD_1$–$CMD_4$ which are comprised of $CDB_1$–$CDB_4$ 152 and $SGL_1$–$SGL_4$ 152. Upon completion of processing $CMD_0$, $CMD_x$ is sent to the disk drive 146 to execute the write command for like contiguous files F1–F4. Accordingly, files F1–F4 are written to disk 146 from respective RAM 140 locations. In this embodiment, the four files are written to disk 146 by one command, thereby generating one interrupt as opposed to four interrupts if the write commands were processed individually. In addition, the mechanical activity of the disk drive is more precise and efficient so that unnecessary disk rotation and read/write head movement is minimized. In another embodiment of the invention, where there is a request to write a large file to disk, the write command is typically broken up to write portions of the file to free contiguous space on the disk. It should be appreciated that the command merge system will consolidate the write commands so that only one interrupt is issued in this embodiment.

As used with respect to FIGS. 3 and 4 files F1–F6 can also be file fragments associated with the commands for the file fragments in one embodiment of the invention. In another embodiment, the commands are commands issued by the operating system to read raw sectors for demand paging, etc.

As mentioned above, while FIGS. 3 and 4 illustrate like commands residing in the driver queue 138, this is not meant to be restrictive. The commands in the driver queue 138 may be any combination of read and/or write commands. In this embodiment, the commands are examined and the like contiguous commands are combined as described above where possible. In addition, it should be appreciated that the new command $CMD_x$ and its contents are transparent to the operating system.

Furthermore, associated with each command are multiple components of time. The components of time relate to the different functions which correlate to the commands. For example, for a read or write command the following time components can be considered:

A CPU overhead (Cp); an interrupt overhead (In); a seek time for the disk, i.e., physically moving the head from one sector to another, (Sd); a rotational latency of the disk (Ld) and a transfer time to transfer the data (Tr). The time components associated with a read or write command can be represented by the following equation:

$$C_1 = Cp + In + Sd + Ld + Tr$$

Where $C_1$ is the sum of the times for each of the components for command 1. Accordingly, the time associated for each read or write command processed individually (command 1-command n) is the summation of each of the time components for command 1-command n.

However, when the like contiguous commands are combined the time component for the combined command is significantly less than the sum of the individual time components. The following equation defines the time component ($C_{1-n}$) for command 1-command n.

$$C_{1-n} = Cp_1 + In_1 + Sd_1 + Ld_i + (Tr_1 + Tr_2 + \ldots Tr_n)$$

As illustrated by the above equation, when the commands are combined the only additive portion of the equation is that referring to the transfer times for the read or write commands. Accordingly, the CPU overhead; the interrupt overhead; the seek time for the disk and the rotational latency of the disk are only performed once, i.e., they are not additive when the commands are combined. In one embodiment, the seek time drops out of the equation since the electromagnetic head reads from or writes to contiguous areas of the disk. It should be appreciated that even at the fastest disk rotation, the rotational latency may be as high as 6 milliseconds. Therefore, by combining the read or write commands a substantial time savings is gained in terms of performance.

Figure 5:
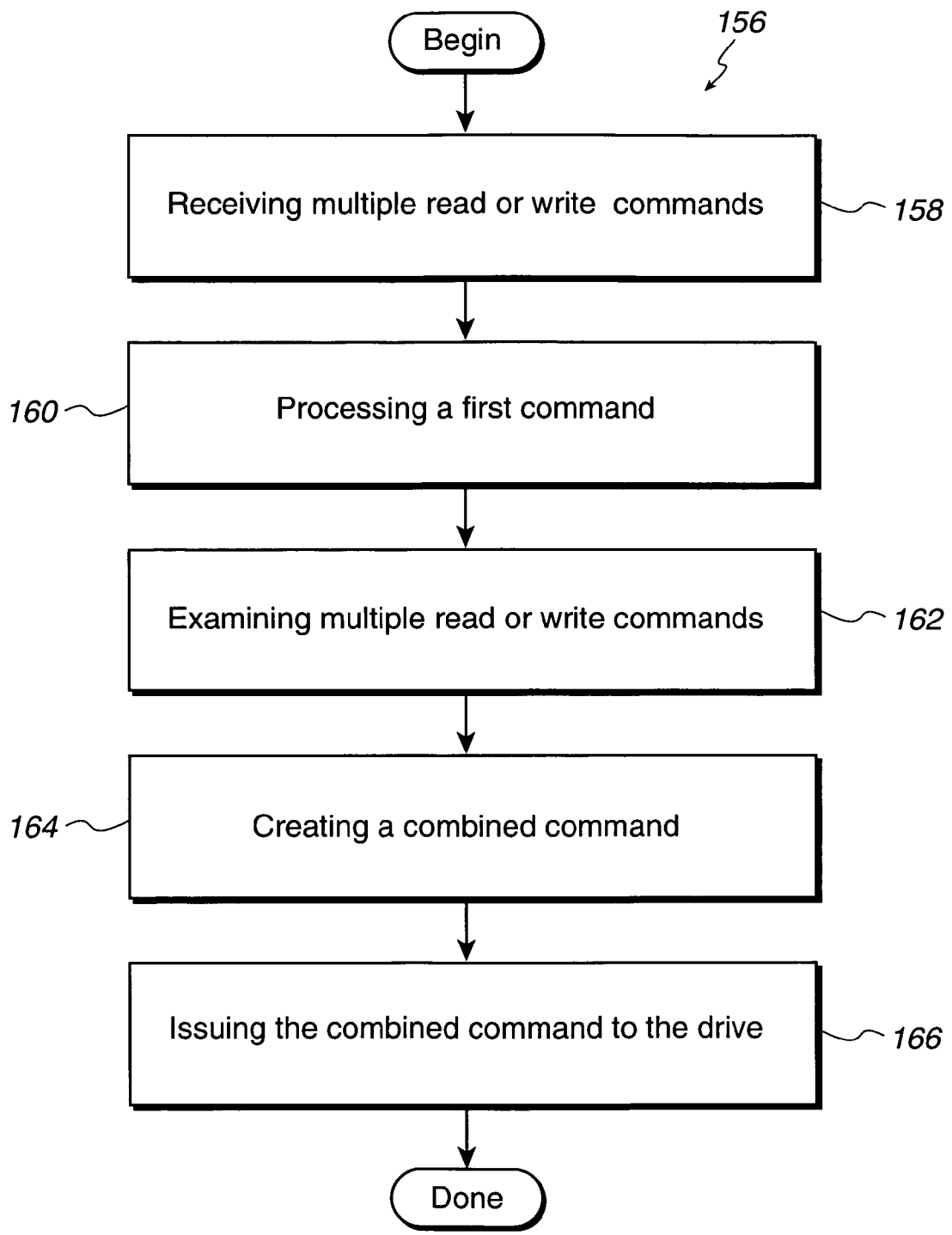
FIG. 5 illustrates a flowchart displaying a method for combining commands for data transfers between a drive and memory in accordance with one embodiment of the invention.

FIG. 5 illustrates flowchart 156 displaying a method for combining commands for data transfers between a drive and memory in accordance with one embodiment of the invention. Flowchart 156 initiates with operation 158 where multiple read or write commands are received. In one embodiment, the commands are received into a drive queue. It should be appreciated that the read and write commands are generated from an operating system. The method then advances to operation 160 where a first command of the multiple read and write commands is processed. For example, a first command of the multiple read and write commands is sent to the queue. Since it is the first command, it will be sent to the drive for processing in one embodiment. Because the processing time for a drive to process a read or write command is much slower than the speed of the central processing unit (CPU), additional commands come into the queue while the first command is being processed.

Flowchart 156 then advances to operation 162 where the multiple read and write commands are examined. In one embodiment of the invention, like commands of the multiple read and write commands are identified while the first command is being processed. For example, the commands are identified as either a read command or a write command since only read commands can be combined with read commands and only write commands can be combined with write commands. In another embodiment each of the like commands are associated with files stored on a drive. In yet another embodiment, it is determined which of the files associated with the like commands are contiguous files. Here, the CDB of the command is checked to ascertain whether the files are logically contiguous in one embodiment. Next, the method advances to operation 164 where a combined command is created. The combined command consolidates the like commands associated with contiguous files. In one embodiment, the CDB and the SGL of the contiguous like commands are combined to form the combined command. It should be appreciated that the SGL of the combined command is expanded to accommodate the fragments of the individual non-combined commands. In one embodiment, the combined command is transparent to the operating system. Then, the method proceeds to operation 166 where the combined command is issued to the drive upon the completion of processing the first command. In another embodiment, once the drive has executed the combined command, an interrupt is generated to signal that the command has been executed. It should be appreciated that a single interrupt is issued from the combined command rather than multiple interrupts for each of the commands forming the combined command. In yet another embodiment, the method of FIG. 5 is executed in a multithread environment.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for merging like commands for transfers between a storage medium and memory, comprising:
    accumulating a plurality of commands in a queue while a first command is being processed by the storage medium, each of the plurality of commands including a first command data block (CDB) and a first scatter gather list (SGL), the first CDB configured to identify a location of a file on the storage medium, the first SGL configured to include data pointers identifying a location of data in the memory, the plurality of commands in the queue including contiguous commands and non-contiguous commands;
    examining the plurality of commands in the queue while the first command is being processed, the examining further including:
    checking if any of the plurality of commands are like commands through analysis of the first CDB, each of the like commands corresponding to a file stored on a storage medium; and
    determining if any of the files on the storage medium are stored contiguously with respect to one another through analysis of the first CDB;
    combining the like commands corresponding to contiguous files as a combined command, wherein the combined command having a second CDB and a second SGL derived from the first CDB and the first SGL; and
    issuing the combined command to the storage medium upon completion of the processing of the first command.

2. The method as recited in claim 1, wherein the storage medium is a hard drive.

3. The method as recited in claim 1, further including:
    providing a multithread environment, the multithread environment allowing multiple read and write commands to be processed concurrently.

4. The method as recited in claim 1, wherein the combined command is transparent to the operating system.

5. A method for combining commands for data transfer between a drive and memory, comprising:
    receiving multiple read or write commands in a queue, each read and write command includes a first command data block (CDB) and a first scatter gather list (SGL), the first CDB configured to identify a location of a file on the drive, the first SGL being configured to include data pointers identifying a location of data in the memory, the plurality of commands in the queue including contiguous commands and non-contiguous commands;
    processing a first command of the multiple read or write commands;
    examining the multiple read or write commands, the examining including, identifying like commands of the multiple read or write commands through analysis of the first CDB while processing the first command, each of the like commands being associated with a file stored on the drive; and
    examining one of the first CDB and the first SGL to ascertain which of the files associated with the like commands are contiguous files;
    creating a combined command having a second CDB and a second SGL which are derived from the first CDB and the first SGL, the combined command being configured to consolidate the identified like commands being associated with contiguous files; and
    issuing the combined command to the drive.

6. The method as recited in claim 5, further including:
    providing a multithread environment, the multithread environment allowing multiple read and write commands to be processed concurrently.

7. The method as recited in claim 5, wherein the queue has a capacity of 256 commands.

8. The method as recited in claim 5, further including:
    processing the combined command; and
    generating one interrupt for the processed combined command.

9. An apparatus for merging like commands, comprising;
    an operating system, the operating system generating read and write commands;
    a storage media, the storage media being configured to process read and write commands, the read and write commands being associated with files stored on the storage media, each read and write command is associated with a first command data block (CDB) and a first scatter gather list (SGL), the first CDB being configured to identify the location of corresponding files on the storage media, the first SGL being configured to include data pointers identifying a location of data in the memory; and
    a driver queue, the driver queue being configured to receive the read and write commands from the operating system, the read and write commands in the driver queue including contiguous commands and non-contiguous commands, the first CDB for the corresponding read and write commands indicating like commands associated with contiguous files on the storage media, the like commands and respective first CDB and first SGL associated with the like commands being consolidated into a single command having a second CDB and a second SGL which are derived from the first CDB and the first SGL, the single command being issued to the storage media.

10. The apparatus of claim 9, wherein the storage media is a hard drive.

11. The apparatus of claim 9, further including:
    a multithread environment, the multithread environment allowing for multiple combined commands to be processed concurrently.

12. A computer readable media having program instructions for combining commands for data transfer between a drive and memory, comprising:
    program instructions for receiving multiple read or write commands in a queue, each read and write command includes a first command data block (CDB) and a first scatter gather list (SGL), the first CDB configured to identify a location of a file on the drive, the first SGL being configured to include data pointers identifying a location of data in the memory, the read and write commands in the queue including contiguous commands and non-contiguous commands;

program instructions for processing a first command of the multiple read or write commands; program instructions for combining multiple read or write commands, the combining including:

program instructions for identifying like commands of the multiple read or write commands through analysis of the first CDB while processing the first command, each of the like commands being associated with a file stored on the drive, and program instructions for examining one of the first CDB and the first SGL to ascertain which of the files associated with the like commands are contiguous files;

program instructions for creating a combined command having a second CDB and a second SGL, which are derived from the first CDB and the first SGL, the combined command being configured to consolidate the identified like commands being associated with contiguous files; and program instructions for issuing the combined command to the drive.

13. The computer readable media as recited in claim 12, further including:

program instructions for providing a multithread environment.

14. The computer readable media as recited in claim 12, wherein the drive is a hard drive.

\* \* \* \* \*